US011939901B1

(12) United States Patent
Prabhu

(10) Patent No.: US 11,939,901 B1
(45) Date of Patent: Mar. 26, 2024

(54) OXIDIZING REACTOR APPARATUS

(71) Applicant: Edan Prabhu, Mission Viejo, CA (US)

(72) Inventor: Edan Prabhu, Mission Viejo, CA (US)

( * ) Notice: Subject to any disclaimer, the term of this patent is extended or adjusted under 35 U.S.C. 154(b) by 0 days.

(21) Appl. No.: 18/333,202

(22) Filed: Jun. 12, 2023

(51) Int. Cl.
*F01N 3/18* (2006.01)
*F01N 3/10* (2006.01)
*F01N 3/20* (2006.01)
*F02B 37/20* (2006.01)

(52) U.S. Cl.
CPC ................. *F01N 3/18* (2013.01); *F01N 3/10* (2013.01); *F01N 3/20* (2013.01); *F01N 3/2006* (2013.01); *F01N 3/2013* (2013.01); *F01N 3/202* (2013.01); *F01N 3/2033* (2013.01); *F01N 3/204* (2013.01); *F02B 37/20* (2013.01)

(58) Field of Classification Search
CPC ..... F01N 3/10; F01N 3/18; F01N 3/20; F01N 3/2006; F01N 3/2013; F01N 3/202; F01N 3/2026; F01N 3/2033; F01N 3/204; F02B 37/20
See application file for complete search history.

(56) References Cited

U.S. PATENT DOCUMENTS 3,810,732 A 5/1974 Koch
3,928,961 A 12/1975 Pfefferle
3,975,900 A 8/1976 Pfefferle
4,052,143 A 10/1977 Sandviknes
4,202,168 A 5/1980 Acheson et al.
4,202,169 A 5/1980 Acheson et al.
4,209,303 A 6/1980 Ricks
4,403,941 A 9/1983 Okiura et al.
4,442,901 A 4/1984 Zison
4,467,610 A 8/1984 Pearson et al.
4,534,165 A 8/1985 Davis, Jr. et al.
4,643,890 A 2/1987 Schramm
4,769,149 A 9/1988 Nobilet et al.
4,870,824 A 10/1989 Young et al.
5,081,836 A * 1/1992 Smith .................. F02B 37/164
60/303

(Continued)

FOREIGN PATENT DOCUMENTS

CA 2251627 7/2002
CN 112282908 1/2021

(Continued)

*Primary Examiner* — Loren C Edwards
(74) *Attorney, Agent, or Firm* — CIONCA IP Law P.C.

(57) ABSTRACT

An oxidizing reactor apparatus having a heat exchange reactor having an input port, an entry channel in fluid communication with the input port, an exit channel in fluid communication with the entry channel via a plurality of pores and an output port in fluid communication with the exit channel, wherein the exit channel is in thermal communication with the entry channel, an engine in fluid communication with the heat exchange reactor and a heater engaged with the heat exchange reactor to initiate and maintain the oxidation of fuel within the heat exchange reactor. The disclosed heat exchange reactor may be configured to receive engine exhaust from the engine and oxidize fuel within the engine exhaust prior to expelling the engine exhaust. The heat exchange reactor may be further configured to utilize heat released by the oxidation of un-combusted fuel to increase the temperature of the engine exhaust leaving the engine.

22 Claims, 6 Drawing Sheets

(56) References Cited

U.S. PATENT DOCUMENTS

| | | | |
|---|---|---|---|
| 5,108,717 | A | 4/1992 | Deller et al. |
| 5,165,884 | A | 11/1992 | Martin et al. |
| 5,263,314 | A | 11/1993 | Anderson |
| 5,326,253 | A | 7/1994 | Dalla Betta et al. |
| 5,326,537 | A | 7/1994 | Cleary |
| 5,329,955 | A | 7/1994 | Gensler et al. |
| 5,533,890 | A | 7/1996 | Holst et al. |
| 5,583,240 | A | 12/1996 | Asher et al. |
| 5,592,811 | A | 1/1997 | Dodge et al. |
| 5,635,139 | A | 6/1997 | Holst et al. |
| 5,649,720 | A | 7/1997 | Rink et al. |
| 5,685,156 | A | 11/1997 | Willis et al. |
| 5,832,713 | A | 11/1998 | Maese et al. |
| 5,862,858 | A | 1/1999 | Wellington et al. |
| 5,921,763 | A | 7/1999 | Martin |
| 6,019,172 | A | 2/2000 | Wellington et al. |
| 6,033,207 | A | 3/2000 | Cummings |
| 6,107,693 | A | 8/2000 | Mongia et al. |
| 6,142,222 | A | 11/2000 | Kang et al. |
| 6,158,222 | A | 12/2000 | Retallick |
| 6,205,768 | B1 | 3/2001 | Dibble et al. |
| 6,226,976 | B1 | 5/2001 | Scott et al. |
| 6,334,769 | B1 | 1/2002 | Retallick et al. |
| 6,339,925 | B1 | 1/2002 | Hung et al. |
| 6,393,821 | B1 | 5/2002 | Prabhu |
| 6,482,375 | B1 | 11/2002 | van der Wal et al. |
| 6,595,001 | B2 | 7/2003 | Rautenbach et al. |
| 6,675,583 | B2 | 1/2004 | Willis et al. |
| 6,895,760 | B2 | 5/2005 | Kesseli |
| 7,096,671 | B2 | 8/2006 | Bland et al. |
| 7,571,602 | B2 | 8/2009 | Koch |
| 8,393,160 | B2 | 3/2013 | Prabhu |
| 8,443,602 | B2 | 5/2013 | Bennet et al. |
| 8,621,869 | B2 | 1/2014 | Prabhu |
| 8,671,658 | B2 | 3/2014 | Prabhu |
| 8,701,413 | B2 | 4/2014 | Prabhu |
| 8,893,468 | B2 | 11/2014 | Prabhu |
| 9,057,028 | B2 | 6/2015 | Prabhu |
| 9,194,584 | B2 | 11/2015 | Watts |
| 9,587,562 | B2 | 3/2017 | Ostebee et al. |
| 9,926,846 | B2 | 3/2018 | Prabhu |
| 10,167,795 | B2 | 1/2019 | Disaro' et al. |
| 10,376,838 | B2 | 8/2019 | Andersen et al. |
| 10,697,630 | B1 | 6/2020 | Prabhu |
| 11,433,352 | B1 | 6/2022 | Prabhu |
| 11,459,926 | B2 | 10/2022 | Staller et al. |
| 11,519,315 | B1 | 12/2022 | Sakuja et al. |
| 11,585,254 | B2 | 2/2023 | Piche et al. |
| 2003/0213231 | A1* | 11/2003 | Tabata ................ F01N 13/0093 60/297 |
| 2004/0021235 | A1 | 2/2004 | Corr et al. |
| 2004/0119291 | A1 | 6/2004 | Hamrin et al. |
| 2006/0096282 | A1* | 5/2006 | Friedrich .............. F01N 3/0885 60/299 |
| 2006/0150635 | A1 | 7/2006 | Su et al. |
| 2006/0283181 | A1* | 12/2006 | Crawley ................. F01N 3/035 60/303 |
| 2007/0054226 | A1 | 3/2007 | Carroni et al. |
| 2007/0074504 | A1* | 4/2007 | Driscoll ................ F01N 13/011 60/285 |
| 2009/0100820 | A1 | 4/2009 | Prabhu |
| 2009/0217648 | A1* | 9/2009 | Tepesch .................. F01N 3/023 423/245.3 |
| 2010/0275611 | A1 | 11/2010 | Prabhu |
| 2014/0011523 | A1 | 1/2014 | Hines |
| 2020/0040784 | A1 | 2/2020 | Baron Von Ceumern-Lindenstjerna et al. |
| 2022/0205380 | A1 | 6/2022 | Nerheim |
| 2022/0250038 | A1* | 8/2022 | Fujita ....................... B01J 37/08 |
| 2022/0355244 | A1 | 11/2022 | Van Dam et al. |
| 2022/0362747 | A1 | 11/2022 | Debusk et al. |
| 2022/0401906 | A1 | 12/2022 | Dean et al. |

FOREIGN PATENT DOCUMENTS

| | | |
|---|---|---|
| CN | 108533371 | 12/2021 |
| CN | 115715348 | 2/2023 |
| EP | 1633959 | 5/2007 |
| EP | 4037823 | 8/2022 |
| JP | 2004105306 | 4/2004 |
| JP | 2019193933 | 11/2019 |
| JP | 2022130445 | 9/2022 |
| KR | 20230058396 | 5/2023 |
| WO | 2020182705 | 9/2020 |
| WO | 2022055852 | 3/2022 |
| WO | 2022094209 | 5/2022 |
| WO | 2023062340 | 4/2023 |

* cited by examiner

OXIDIZING REACTOR APPARATUS

BACKGROUND OF INVENTION

1. Field of the Invention

The invention relates generally to reactors and specifically to reactor apparatuses configured to utilize porous and non-porous heat exchangers to oxidize fuels without the use of a catalyst.

2. Description of the Related Art

Hydrocarbons, including methane, formaldehyde and carbon monoxide are emitted from internal combustion engines, including lean burn engines. Lean burn engines have become more commonly used because their peak temperatures are lower, which is desirable because lower temperatures reduce the formation of harmful nitrogen oxides commonly referred to as "NOx." However, the excess air that is added to the engine to create the lean burn can sweep un-combusted or partially combusted methane and other gases into the exhaust. Methane is a greenhouse gas, and other hydrocarbons are often toxic.

Lean burn engine manufacturers and operators have attempted for many decades to oxidize the harmful gases with catalytic oxidizers that lower the oxidation temperature of these harmful gases. The most common method of oxidizing methane and other hydrocarbons from the exhaust of lean burn engines is to use expensive noble metal catalysts that lower the oxidation temperature of these gases to lower temperatures, such as about 500° C. However, such catalysts can be "poisoned" or rendered ineffective in the presence of sulfur compounds contained in the fuel. Other oxidization means may use additives that assist in the oxidation the methane and other hydrocarbons. These catalyst based systems are expensive and may not fully oxidize all hydrocarbons, such as methane, within the exhaust. Furthermore, catalysts lose effectiveness over time, and thus will need to be replaced, further increasing the expense of utilizing said catalysts.

Therefore, there is a need to solve the problems described above by providing a device and method for oxidizing methane and other hydrocarbons and fuels from lean burn internal combustion engines, without the use of catalysts.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, an oxidizing reactor apparatus is provided, the oxidizing reactor apparatus comprising: a lean burn engine having an intake end and an exhaust end in fluid communication with the intake end, the lean burn engine being configured to combust a fuel and expel an engine exhaust, wherein the engine exhaust comprises unoxidized fuel; a heat exchange reactor configured to be in fluid communication with the lean burn engine, the heat exchange reactor being further configured to receive the engine exhaust expelled by the lean burn engine and facilitate the oxidization of the unoxidized fuel, the heat exchange reactor comprising: an input port in fluid communication with the exhaust end of the lean burn engine; a plurality of entry channels in fluid communication with the input port, each entry channel of the plurality of entry channels comprising: a non-porous portion of the entry channel, the non-porous portion of the entry channel being in fluid communication with the input port; and a porous portion of the entry channel, the porous portion of the entry channel being in fluid communication with the non-porous portion of the corresponding entry channel; a plurality of exit channels in fluid communication with the plurality of entry channels, each exit channel of the plurality of exit channels comprising: a porous portion of the exit channel, the porous portion of the exit channel being in fluid communication with the porous portion of at least one entry channel of the plurality of entry channels; and a non-porous portion of the exit channel, the non-porous portion of the exit channel being in fluid communication with the porous portion of the corresponding exit channel; and an output port in fluid communication with the non-porous portion of each exit channel of the plurality of exit channels; a heater configured to be engaged with the heat exchange reactor, wherein the heater is further configured to selectively provide heat to the heat exchange reactor to facilitate the oxidation of the unoxidized fuel within the heat exchange reactor; and a turbocharger configured to be associated with the lean burn engine, the turbocharger having: a turbine in fluid communication with the exhaust end of the lean burn engine; a turbocharger shaft engaged with the turbine; and a compressor in fluid communication with the intake end of the lean burn engine and engaged with the turbocharger shaft; wherein the non-porous portion of each entry channel of the plurality of entry channels is in thermal communication with the non-porous portion of at least one exit channel of the plurality of exit channels, such that the non-porous portion of each exit channel of the plurality of exit channels is configured to transfer heat energy to the non-porous portion of at least one entry channel of the plurality of entry channels; and wherein the porous portion of each exit channel of the plurality of exit channels is configured to receive engine exhaust from the porous portion of at least one entry channel of the plurality of entry channels through a plurality of pores, wherein each pore of the plurality of pores is disposed between an exit channel of the plurality of exit channels and a corresponding entry channel of the plurality of exit channels Thus an advantage is that the exothermic oxidation of the fuel within the heat exchange reactor may be configured to provide heat to the heat exchange reactor to initiate or maintain the continuous oxidation reaction, through heat transfer between the outgoing, oxidized engine exhaust within the exit channels and the incoming engine exhaust within the entry channels. Another advantage is that the turbocharger may be engaged with the heat exchange reactor and/or lean burn engine, such that the flow of engine exhaust generated by the lean burn engine may be utilized to improve air intake into the lean burn engine. In a particular embodiment, wherein the turbine of the turbocharger is downstream from the heat exchange reactor, the higher temperature within the heat exchange reactor that results from oxidation the engine exhaust within the heat exchange reactor may allow the engine exhaust to rotate the turbine of the turbocharger more rapidly, thus providing more energy to a compressor engaged with the turbine and lean burn engine, and thereby increasing pressure of the air intake to the lean burn engine. Another advantage is that the porous portions of the heat exchange reactor may be configured to slow down the mass velocity of the engine exhaust, thus increasing the residence time of the engine exhaust within the heat exchange reactor, thereby allowing the fuel within the engine exhaust to achieve substantially full oxidation. Another advantage is that the disclosed oxidizing reactor apparatus is configured to oxidize exhaust without the use of catalysts, thus avoiding the utilization of a potentially expensive and vulnerable material.

In another aspect, an oxidizing reactor apparatus is provided, the oxidizing reactor apparatus comprising: an engine having an intake end and an exhaust end in fluid communication with the intake end, the engine being configured to combust a fuel and expel engine exhaust, wherein the engine exhaust comprises unoxidized fuel; a heat exchange reactor configured to be in fluid communication with the engine, the heat exchange reactor being further configured to receive the engine exhaust expelled by the engine and facilitate the oxidization of the unoxidized fuel, the heat exchange reactor comprising: an input port in fluid communication with the exhaust end of the engine; a plurality of entry channels in fluid communication with the input port, each entry channel of the plurality of entry channels comprising: a non-porous portion of the entry channel, the non-porous portion of the entry channel being in fluid communication with the input port; and a porous portion of the entry channel, the porous portion of the entry channel being in fluid communication with the non-porous portion of the corresponding entry channel; a plurality of exit channels in fluid communication with the plurality of entry channels, each exit channel of the plurality of exit channels comprising: a porous portion of the exit channel, the porous portion of the exit channel being in fluid communication with the porous portion of at least one entry channel of the plurality of entry channels; and a non-porous portion of the exit channel, the non-porous portion of the exit channel being in fluid communication with the porous portion of the corresponding exit channel; and an output port in fluid communication with the non-porous portion of each exit channel of the plurality of exit channels; a heater configured to be engaged with the heat exchange reactor, wherein the heater is further configured to selectively provide heat to the heat exchange reactor to facilitate the oxidation of the unoxidized fuel within the heat exchange reactor; wherein the non-porous portion of each entry channel of the plurality of entry channels is in thermal communication with the non-porous portion of at least one exit channel of the plurality of exit channels, such that the non-porous portion of each exit channel of the plurality of exit channels is configured to transfer heat energy to the non-porous portion of at least one entry channel of the plurality of entry channels; and wherein the porous portion of each exit channel of the plurality of exit channels is configured to receive engine exhaust from the porous portion of at least one entry channel of the plurality of entry channels through a plurality of pores, wherein each pore of the plurality of pores is disposed between an exit channel of the plurality of exit channels and a corresponding entry channel of the plurality of exit channels.

Thus an advantage is that the exothermic oxidation of the fuel within the heat exchange reactor may be configured to provide heat to the heat exchange reactor to initiate or maintain the continuous oxidation reaction, through heat transfer between the outgoing, oxidized engine exhaust within the exit channels and the incoming engine exhaust within the entry channels. Another advantage is that a turbocharger may be engaged with the heat exchange reactor and/or engine, such that the flow of engine exhaust generated by the engine may be utilized to improve air intake into the engine. In a particular embodiment, wherein the turbine of the turbocharger is downstream from the heat exchange reactor, the higher temperature within the heat exchange reactor that results from oxidation the engine exhaust within the heat exchange reactor may allow the engine exhaust to rotate the turbine of the turbocharger more rapidly, thus providing more energy to a compressor engaged with the turbine and engine, and thereby increasing pressure of the air intake to the engine. Another advantage is that the porous portions of the heat exchange reactor may be configured to slow down the mass velocity of the engine exhaust, thus increasing the residence time of the engine exhaust within the heat exchange reactor, thereby allowing the fuel within the engine exhaust to achieve substantially full oxidation. Another advantage is that the disclosed oxidizing reactor apparatus is configured to oxidize exhaust without the use of catalysts, thus avoiding the utilization of a potentially expensive and vulnerable material. Another advantage is that the disclosed oxidizing reactor apparatus may utilize an auxiliary oxygen input to provide additional oxygen to the engine exhaust to ensure optimized oxidation of the fuel, for application in which utilization a lean burn engine may not be desirable or possible.

In another aspect, an oxidizing reactor apparatus is provided, the oxidizing reactor apparatus comprising: an engine configured to expel engine exhaust having unoxidized fuel; a heat exchange reactor configured to be in fluid communication with the engine, the heat exchange reactor being further configured to receive the expelled engine exhaust to facilitate the oxidization of the unoxidized fuel, the heat exchange reactor comprising: an input port in fluid communication configured to receive the engine exhaust; an entry channel in fluid communication with the input port, the entry channel comprising: a non-porous portion of the entry channel, the non-porous portion of the entry channel being in fluid communication with the input port; and a porous portion of the entry channel, the porous portion of the entry channel being in fluid communication with the non-porous portion of the entry channel; an exit channel in fluid communication with the entry channel, the exit channel comprising: a porous portion of the exit channel, the porous portion of the exit channel being in fluid communication with the porous portion of the entry channel; and a non-porous portion of the exit channel, the non-porous portion of the exit channel being in fluid communication with the porous portion of the exit channel; and an output port in fluid communication with the porous portion of the exit channel; and a heater configured to be engaged with the heat exchange reactor, wherein the heater is further configured to selectively provide heat to the heat exchange reactor to facilitate the oxidation of the unoxidized fuel; wherein the non-porous portion of the entry channel is in thermal communication with the non-porous portion of the exit channel, such that the non-porous portion of the exit channel is configured to transfer heat energy to the non-porous portion of the entry channel; and wherein the porous portion of the exit channel is configured to receive the engine exhaust from the porous portion of the entry channel through pores disposed between the entry channel and the exit channel.

Thus an advantage is that the exothermic oxidation of the fuel within the heat exchange reactor may be configured to provide heat to the heat exchange reactor to initiate or maintain the continuous oxidation reaction, through heat transfer between the outgoing, oxidized engine exhaust within the exit channels and the incoming engine exhaust within the entry channels. Another advantage is that a turbocharger may be engaged with the heat exchange reactor and/or engine, such that the flow of engine exhaust generated by the engine may be utilized to improve air intake into the engine. In a particular embodiment, wherein the turbine of the turbocharger is downstream from the heat exchange reactor, the higher temperature within the heat exchange reactor that results from oxidation the engine exhaust within the heat exchange reactor may allow the engine exhaust to rotate the turbine of the turbocharger more rapidly, thus providing more energy to a compressor engaged with the turbine and engine, and thereby increasing pressure of the air intake to the engine. Another advantage is that the porous portions of the heat exchange reactor may be configured to slow down the mass velocity of the engine exhaust, thus increasing the residence time of the engine exhaust within the heat exchange reactor, thereby allowing the fuel within the engine exhaust to achieve substantially full oxidation. Another advantage is that the disclosed oxidizing reactor apparatus is configured to oxidize exhaust without the use of catalysts, thus avoiding the utilization of a potentially expensive and vulnerable material. Another advantage is that the disclosed oxidizing reactor apparatus may utilize an auxiliary oxygen input to provide additional oxygen to the engine exhaust to ensure optimized oxidation of the fuel, for application in which utilization a lean burn engine may not be desirable or possible.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
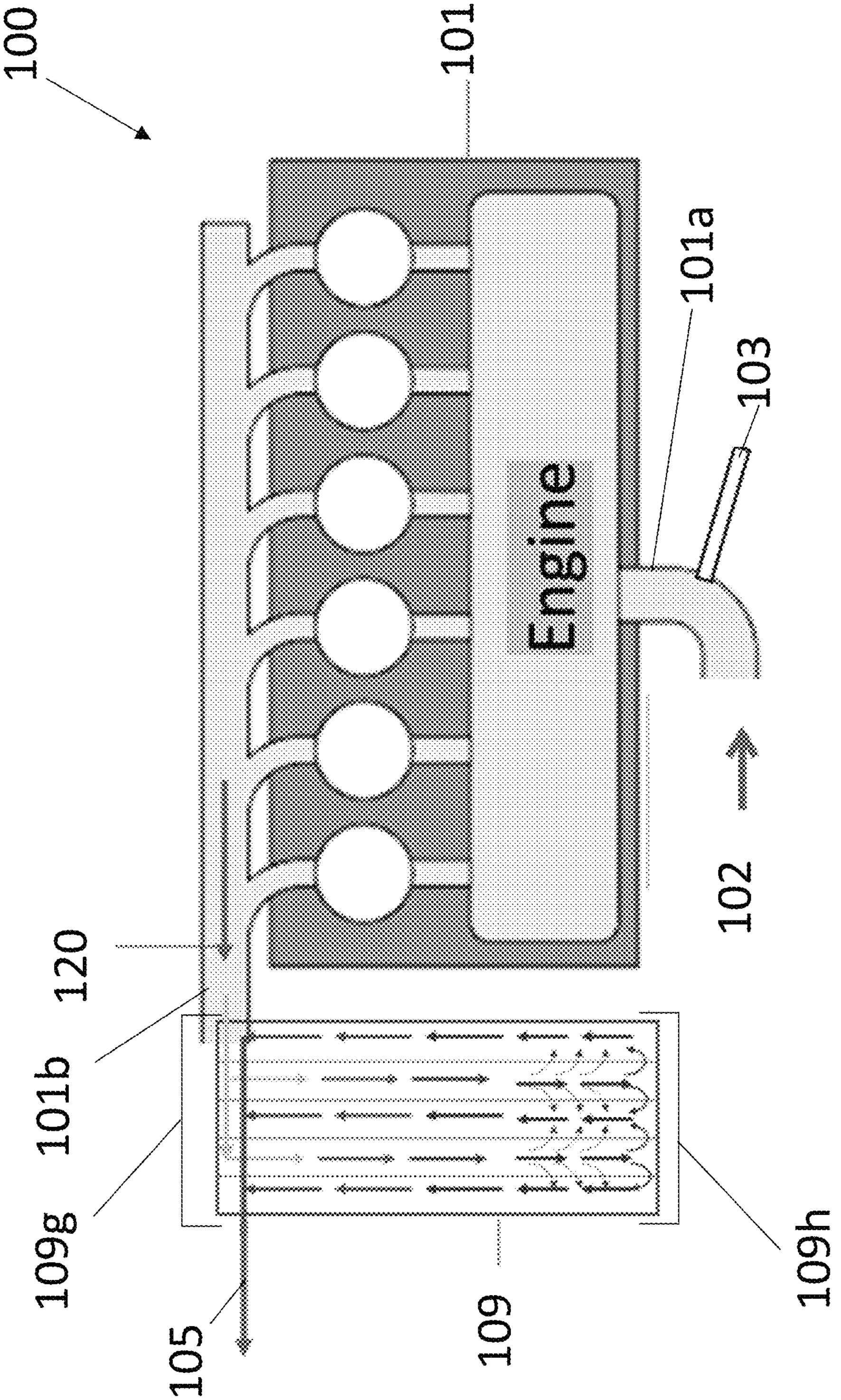
FIG. 1 illustrates an oxidizing reactor apparatus having a lean burn engine with the heat exchange reactor located at the exhaust end of the lean burn engine, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 101 and 201, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 illustrates an oxidizing reactor apparatus 100 having a lean burn engine 101 with the porous heat exchanger 109 located at the exhaust end ("exhaust pipe") 101*b* of the lean burn engine 101, according to an aspect. As can be seen in FIG. 1, the disclosed lean burn engine ("engine") 101 may utilize a heat exchange reactor ("porous heat exchanger", "reactor") 109 that comprises both porous and non-porous portions, such as porous portion 409*f* and non-porous portion 409*e* of FIG. 4, installed on the exhaust end 101*b* of a natural gas lean burn engine 101. Air flows into the engine through intake duct 102, and fuel is introduced to the engine through the fuel pipe 103. The fuel and air travelling through the fuel pipe 103 and intake duct 102, respectively, are configured to enter the intake end 101*a* of the engine 101 and be combusted within said engine 101. The combusted engine exhaust 120 containing unoxidized fuel, oxygen, nitrogen, and carbon dioxide, is configured to exit the engine 101 through the exhaust pipe 101*b*.

In an embodiment, the engine exhaust 120 exiting a lean burn engine 101 may be about 500° C., which is often insufficient to fully oxidize the harmful fuel(s) in the engine exhaust 120 in the short residence time available within the engine 101. It should be understood that the entire apparatus of FIG. 1, including the lean burn engine 101, heat exchanger 109, etc., may be referred to as an oxidizing reactor apparatus ("exhaust oxidizing engine apparatus", "reactor apparatus") 100. The porous heat exchanger 109 used for this disclosed oxidizing reactor apparatus 100 may comprise porous and non-porous portions and may be configured to engage with an engine, such as a lean burn engine 101. In an embodiment, the disclosed porous heat exchanger 109 may be configured to work particularly well with lean burn engines because the temperature of the engine exhaust leaving the engine 120 is higher than that air in the ambient environment 130, and because the lean burn provides sufficient oxygen for oxidation of the unoxidized fuel, thus allowing for a smaller heat exchange reactor 109 to be implemented. It should be understood that the fuel provided to the engine 101 and oxidized within the porous heat exchanger 109 may be a liquid, gas or combination of liquids and gases, and that the phase of the fuel may change as it combusts or oxidizes within the oxidizing reactor apparatus 100. In an embodiment, In some instances, natural gas may be added to diesel or gasoline engines as part of the fuel to reduce methane slip.

In an embodiment, a lean burn internal combustion engine 101 may have a fuel slip (e.g., fuel that passes through the engine without being combusted) that is about 0.3% fuel by volume. It should be understood that the fuel may comprise methane and/or other gases such as formaldehyde, other VOCs, carbon monoxide, hydrogen, ammonia, and any other hydrocarbons that may be present. The exhaust in most lean burn engines commonly has over 5% oxygen by volume, which is more than what is needed to oxidize the slipping fuel within the engine exhaust. In an embodiment, when the fuel oxidizes within the porous heat exchanger, the temperature of the engine exhaust stream increases by about 80° C. This approximately 80° C. temperature differential is sufficient to heat the engine exhaust entering the porous heat exchanger 109 to the desired threshold for oxidation. Fuel slip of lower concentrations than 0.3% by volume can also be oxidized using a larger porous heat exchanger 109.

In the disclosed embodiments, the porous heat exchanger 109 does not use catalysts. In the present embodiment of FIG. 1, the porous heat exchanger 109 is installed downstream of the engine 101 and attached to the exhaust pipe 101*b* of said engine 101. All engine exhaust is configured to travel through a non-porous section of an entry channel, such as entry channel 409*c* of FIG. 4, at the top/near end 109*g* of the porous heat exchanger 109, then through the porous section at the bottom/far end 109*h* of the heat exchanger 109 via the pores, such as pores 409*i* of FIG. 4, to enter an exit channel, such as exit channel 409*d* of FIG. 4. In an embodiment, the exit channel(s), such as exit channels 409*d* of FIG. 4, may be referred to as the "hot side" of the porous heat exchanger 109, whereas the entry channel (s), such as entry channels 409*c* of FIG. 4, may be referred to as the "cold side" of the porous heat exchanger 109. After traveling through the pores in the porous section from an entry channel to an exit channel, all engine exhaust flows to the non-porous portion of the exit channel at the top/near end 109*g* of the porous heat exchanger 109 to heat the newly incoming engine exhaust 120 from the engine 101, as will be discussed in greater detail below in FIG. 4. The engine exhaust 120 may leave the porous heat exchanger as oxidized engine exhaust 105, which is substantially free of fuel or other oxidizable pollutants.

In an embodiment, heat transfer occurs between the entry channels and the exit channels to raise the temperature of the fuel within the engine exhaust up to its corresponding normal rapid oxidation temperature, which may be about 800° C. for methane or higher/lower for other fuels. The engine exhaust 120 entering the porous heat exchanger 109 is thus substantially oxidized prior to exiting the porous heat exchanger 109. The oxidation reaction of the fuel within the engine exhaust further raises the temperature of the engine exhaust, and the hotter, exiting engine exhaust then heats up the colder, entering engine exhaust, after which the exiting engine exhaust exits the porous heat exchanger 109.

In an embodiment, the engine exhaust travelling through the porous heat exchanger may be heated to about 880° C. for engine exhaust having 0.3% methane by volume. In an embodiment, the engine exhaust entering the porous heat exchanger 109 (e.g., the entering engine exhaust) may be at about 500° C., and the porous heat exchanger 109 may thusly be configured to increase the temperature of the engine exhaust to about 800° C. through heat transfer, in order for rapid oxidation of the methane or other fuels to occur. Because all engine exhaust will pass through a plurality of small pores within the porous portion of the porous heat exchanger 109, and all engine exhaust may be configured to be heated to at least 800° C., all fuels, such as methane, carbon monoxide and other hydrocarbons may be oxidized prior to exiting the porous heat exchanger 109, thus releasing additional energy to aid in the oxidization of new fuel entering the porous heat exchanger 109.

Figure 2:
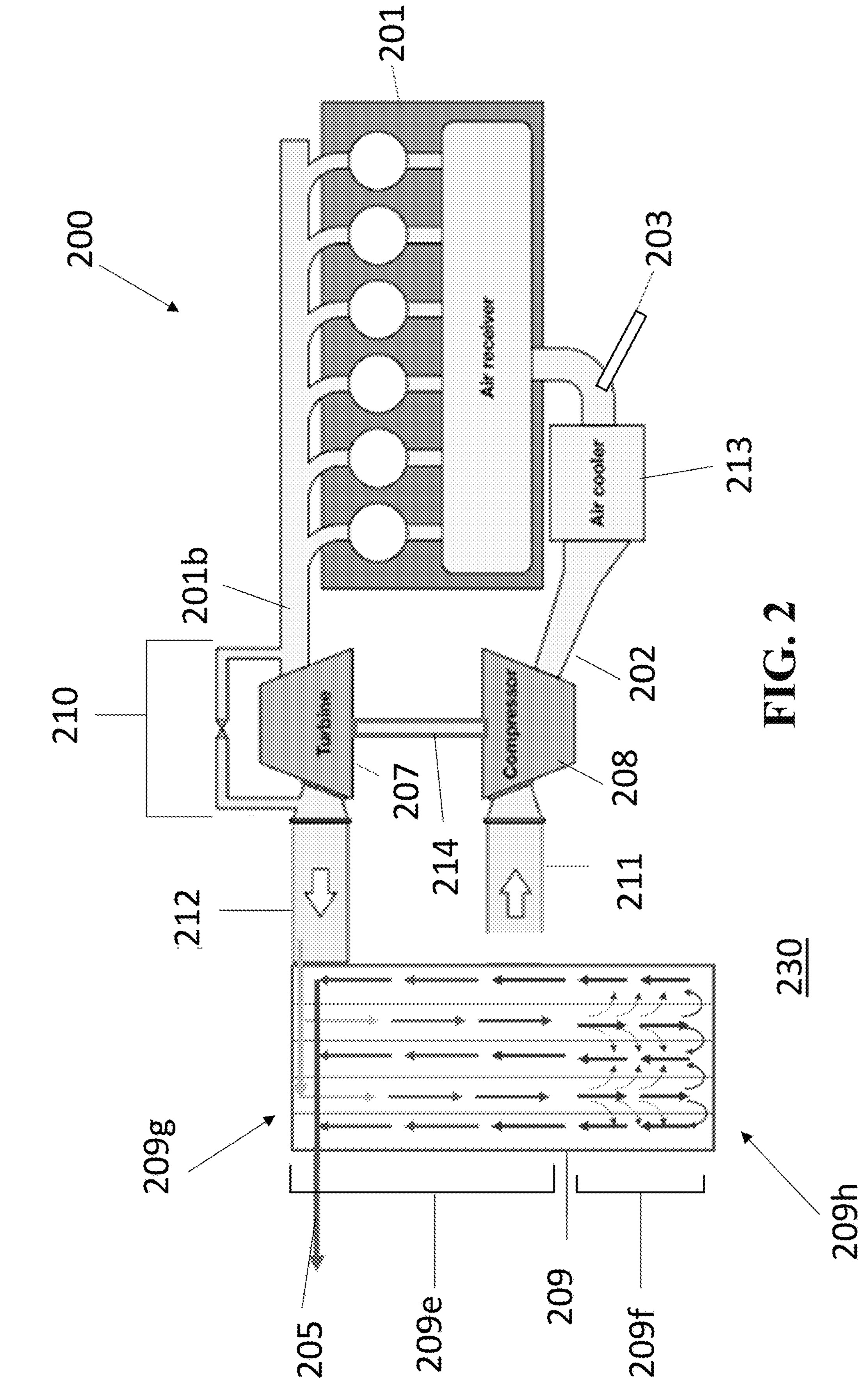
FIG. 2 illustrates an oxidizing reactor apparatus having a lean burn engine, a turbocharger and a heat exchange reactor positioned downstream from the turbine of the turbocharger, according to an aspect.

FIG. 2 illustrates an oxidizing reactor apparatus 200 having a lean burn engine 201, a turbocharger 210 and a porous heat exchanger 209 positioned downstream from the turbine 207 of the turbocharger 210, according to an aspect. The lean burn engine 201 of FIG. 2 may be engaged with, or otherwise in communication with, a turbocharger 210, the turbocharger 210 comprising a turbine 207, and a compressor 208 engaged with the turbine 207. The turbine 207 may be configured to be driven by the engine exhaust, which in turn drives or otherwise powers the compressor 208 to boost the pressure of air entering the engine 201, wherein the higher pressure of the entering air allows the engine to consume more fuel and increase its power output. As will be described in greater detail hereinbelow, the porous heat exchanger 209 may contain both a porous portion ("porous section") 209*f* and a non-porous portion ("non-porous section") 209*e*. In an embodiment, the disclosed turbocharger 210 comprises a turbine 207, a turbocharger shaft 214 engaged with the turbine and a compressor 208 in communication with the turbine 207 via a turbocharger shaft 214, such that the flow of engine exhaust through the turbine 207 drives said turbine 207, which drives the compressor 208, thus delivering air to the engine at above atmospheric pressure. The turbine 207 may be in further communication with the exhaust end 201*b* of the engine 201 and the turbine outlet 212, such that engine exhaust may travel from the exhaust end 201*b*, through the turbine 207 and then through the turbine outlet 212 and into the porous heat exchanger 209. The disclosed porous heat exchanger 209 may be in communication with the turbine outlet 212 of the turbocharger turbine 207, such that engine exhaust exiting the turbine 207 enters the porous heat exchanger 209. It should be understood that the term "communication" utilized herein may be utilized to describe the fluid communication between the various structures of the oxidizing reactor apparatus 200, wherein gases may flow between structures that are in communication/fluid communication with each other.

In the disclosed embodiment of FIG. 2, air from the external environment 230 may enter the engine 201 through a compressor intake 211 before entering the compressor 208. The compressor 208 may be configured to pull air into the engine, driven by the attached turbine 207. The air flows through the compressor 208, through an air cooler 213 and an intake duct 202, while fuel is introduced to the engine 201 through fuel pipe 203, similarly to engine 101 of FIG. 1. The air cooler 213 may be configured to cool air that is fed into the engine 201 through the compressor 208, as the compressor 208 may end up heating the incoming air to an undesirable degree prior to entering the engine 201. The air cooler 213 may not be a required structure in the disclosed oxidizing reactor apparatus 200, but may be desirable in certain embodiments in which the moderation of intake air temperature is significant. The fuel and air are combusted together within the engine 201. In an embodiment, the engine exhaust produced by the combustion flows out of the exhaust end 201*b* of the engine 201 and passes through and drives the turbine 207 of the turbocharger 210 before exiting the turbocharger 210 through the turbine outlet 212, at a temperature of about 350° C. The porous heat exchanger 209 may be installed downstream of exhaust 204 and the turbine 207 of the turbocharger 210.

The porous heat exchanger 209 may be configured such that all engine exhaust travels through the non-porous section 209*e* of the entry channels at the near/top end 209*g* of the porous heat exchanger 209, then through the porous section 209*f* of the entry channels into the porous section 209*f* of the exit channels at the far/bottom end 209*h* of the heat exchanger 209 via a plurality of pores, and then though the non-porous section 209*e* of the exit channels to exit the porous heat exchanger 209 as oxidized engine exhaust 205. The porous heat exchanger 209 of said embodiment may be configured to lift the engine exhaust temperature from about 350° C. to about 800° C. Furthermore, the oxidation of the fuel within the engine exhaust may be configured to further increase the temperature of the engine exhaust to about 880° C., thus substantially oxidizing the fuel within the engine exhaust. As is understood, the oxidizing reactor apparatus 200 of FIG. 2 may comprise a lean burn engine 201, a turbocharger 210 engaged with and in communication with the lean burn engine 201, and a porous heat exchanger 209 engaged with/in communication with the turbine 207 of the turbocharger 210.

Figure 4:
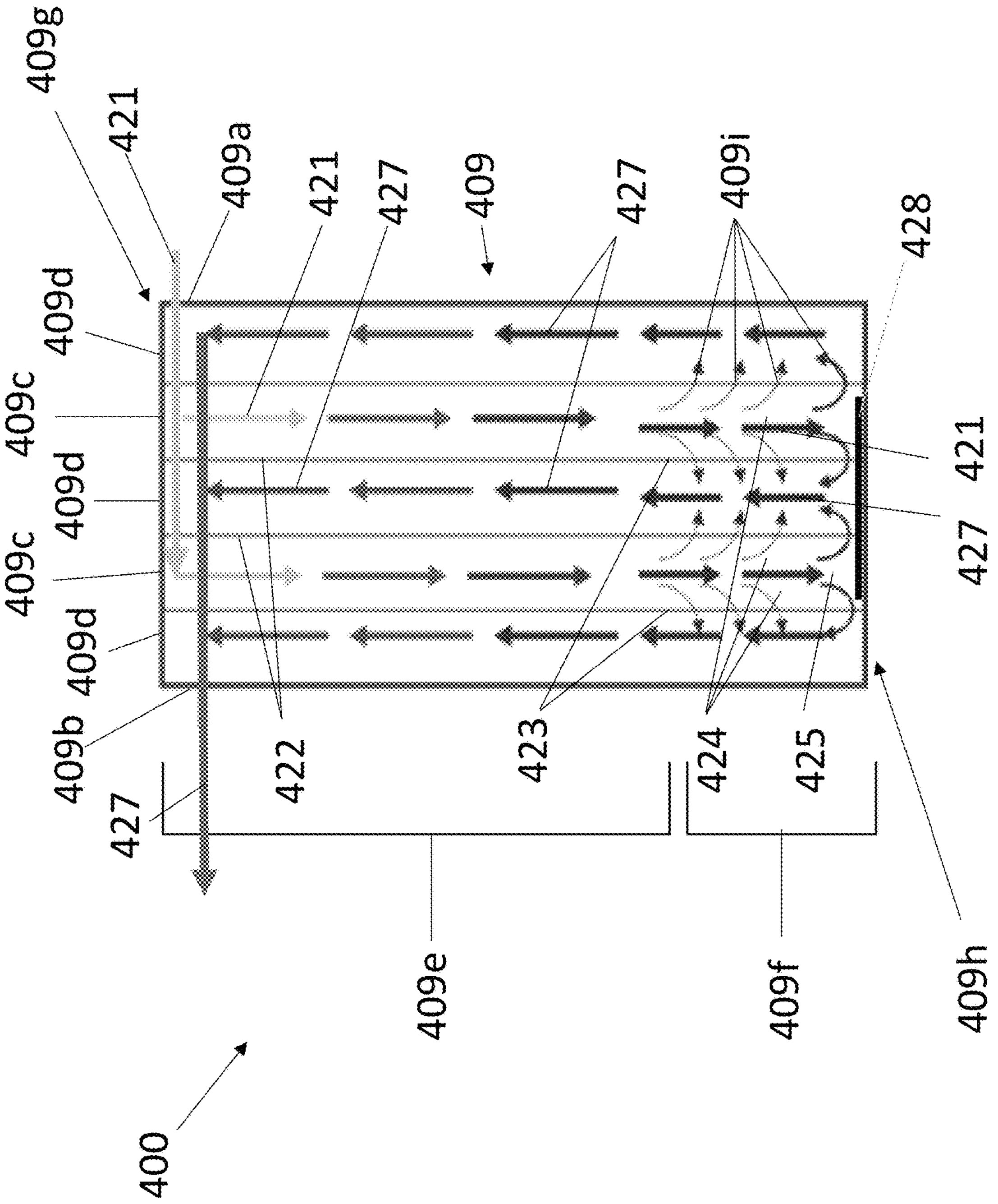
FIG. 4 illustrates a heat exchange reactor, according to an aspect.

It should be understood that the oxidizing reactor apparatus 200 may be made from materials configured to remain functional and undamaged at the high operational temperature (such as about 880° C.) described herein. For example, high melting point metals, such as stainless steel or other high nickel alloys, may be used in the construction of the porous heat exchanger 209. In the embodiment of FIG. 4, the porous sections 409*f* of the entry channels 409*c* and the exit channels 409*d* may be made of/comprise a metal, such as the above mentioned stainless steel. In an alternative embodiment, the porous sections 409*f* of the entry channels 409*c* and the exit channels 409*d* may be made of a non-metal material. In another alternative embodiment, the porous sections 409*f* of the entry channels 409*c* and the exit channels 409*d* may be made of a composite material.

Figure 3:
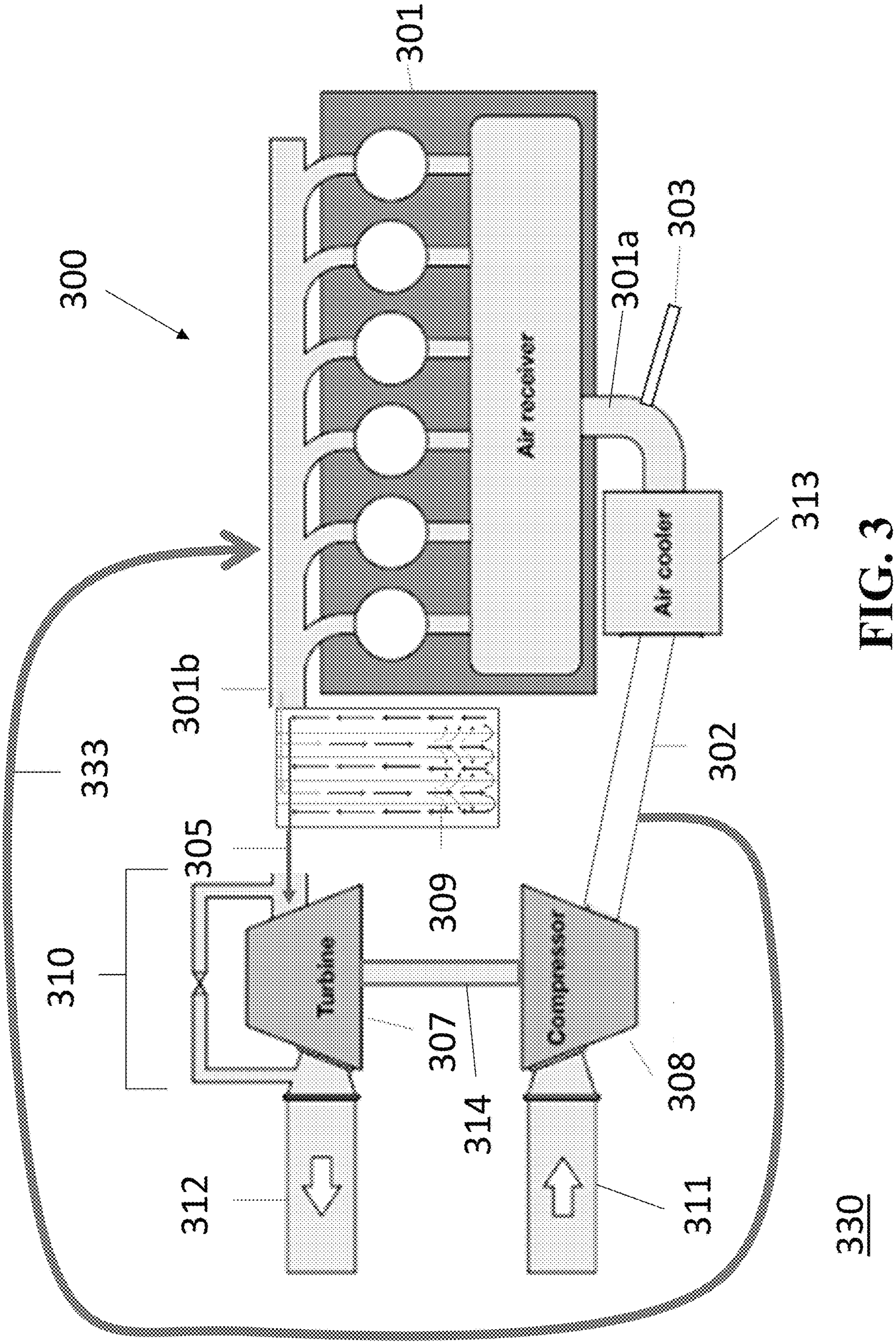
FIG. 3 illustrates an oxidizing reactor apparatus having a lean burn engine, a turbocharger and a heat exchange reactor positioned upstream from the turbine of the turbocharger, according to an aspect.

FIG. 3 illustrates an oxidizing reactor apparatus 300 having a lean burn engine 301, a turbocharger 310 and a porous heat exchanger 309 positioned upstream from the turbine 307 of the turbocharger 310, according to an aspect. In contrast to the oxidizing reactor apparatus 200 configuration in FIG. 2, the turbine 307 of the turbocharger 310 of FIG. 3 may be positioned upstream of the porous heat exchanger 309, and thus the porous heat exchanger 309 may be disposed between the engine and the turbine 307 of the turbocharger 310, as will be described hereinbelow. In the oxidizing reactor apparatus 300 of FIG. 3, air from the external environment 330 may flow into the compressor 308 through a compressor intake 311 and then from the compressor 308 into the engine 301 through intake duct 302 having an air cooler 313, wherein fuel is introduced to the engine through the fuel pipe 303.

The fuel and air are combusted together within the engine 301, similarly to engine 101 of FIG. 1, and resultant engine exhaust may be configured to pass through exhaust end 301*b* of the engine 301, wherein the temperature of the engine exhaust may be about 500° C., in the said embodiment. The engine exhaust from the exhaust end 301*b* is then configured to pass through the porous heat exchanger 309, thus substantially oxidizing all fuel in the engine exhaust to form oxidized engine exhaust 305, resulting in the substantially oxidized engine exhaust 305 entering the turbine 307 of the turbocharger 310 at temperature of about 580° C., for the present embodiment. The substantially oxidized engine exhaust 305 enters through and drives the turbine 307 of the turbocharger 310 and then exits the turbocharger 310 through a turbine outlet 312 at about 430° C., for the present embodiment. As a result of the engine exhaust undergoing oxidation prior to entering the turbine 307, the temperature of the substantially oxidized engine exhaust 305 entering the turbine 307 is hotter than it would be if the engine exhaust had entered the turbine 307 before oxidation for a comparable embodiment, thus rotating the turbine faster and providing more power to the compressor 308. Air delivered to the engine 301 is therefore at a higher pressure, and the engine can consume more fuel and generate more power.

As described above, an advantage of the particular oxidizing reactor apparatus 300 of FIG. 3, is that when the porous heat exchanger 309 is positioned upstream of the turbine 307 of the turbocharger 310, as seen in FIG. 3, additional energy is extracted from the engine exhaust by oxidizing the remaining fuel in the engine exhaust prior to traveling through the turbine 307. Hotter gas has more energy to impart to the turbine 307, which therefore rotates faster and delivers more power to the compressor 308. Instead of simply oxidizing the fuel in the engine exhaust as seen in the oxidizing reactor apparatus embodiment 200 of FIG. 2, in the oxidizing reactor apparatus embodiment of FIG. 3, some of the energy in the engine exhaust from the oxidizing of the fuel is recovered. Another advantage of the oxidizing reactor apparatus 300 arrangement in FIG. 3 is that the pressure upstream of the turbocharger 310 is usually higher, and may be 2 to 3 bar in this embodiment. Pressurized gas is denser, and thus the size of the porous heat exchanger 309 for this particular embodiment may be one-half to one-third of the size it would otherwise need to be, if said porous heat exchanger 309 were located downstream of the turbine 307 of the turbocharger 310.

It should be understood that each of the three reactor apparatus embodiments disclosed hereinabove (e.g., oxidizing reactor apparatus 100, 200, 300 of FIGS. 1, 2, 3, respectively), each having their unique positions for the porous heat exchanger, and thus may have their own advantages and disadvantages. Furthermore, each oxidizing reactor apparatus design must be evaluated to provide the appropriate porous heat exchanger 309 positioning, engine type and other characteristics. As is understood, the oxidizing reactor apparatus 300 of FIG. 3 may comprise a lean burn engine 301, a turbocharger 310 engaged with and in fluid communication with the lean burn engine 301, and a porous heat exchanger 309 engaged/in fluid communication with the exhaust end 301*b* of the lean burn engine 301 and the turbine 307 of the turbocharger 310. As with all applicable embodiments, the turbocharger 310 may comprise a turbine 307 and a compressor 308 engaged with the turbine 307 through a turbocharger shaft 314, wherein the rotation of the turbine 307 powers the compressor 308, thus delivering air at a higher pressure into the engine 301.

In an alternative embodiment, the porous heat exchanger 309 may be configured to engage with multiple engines 301, such that the porous heat exchanger 309 is configured to receive expelled engine exhaust from multiple engines 301. In said alternative embodiment, each engine of the multiple engines may expel engine exhaust containing a fuel, wherein the engine exhaust from each engine is fed into an input port, such as input port 409*a* of FIG. 4, of the porous heat exchanger 309. The porous heat exchanger may thusly be configured to receive the combined engine exhaust from the engines that it is in fluid communication with. As with previous embodiments, the now combined engine exhaust may travel through the porous heat exchanger, and the fuel within the combined engine exhaust may be oxidized accordingly.

It should be noted that certain modifications may be made to the disclosed embodiments of the oxidizing reactor apparatus 300 in order to facilitate the introduction of additional oxygen as needed to substantially oxidize the fuel within the engine exhaust. One such modification may be the implementation of a supplemental oxygen stream between the intake duct 302 and the exhaust end 301*b* of the engine 301. Oxygen from the intake duct 302 may be fed into the exhaust gas by a supplemental oxygen channel 333, wherein said supplemental oxygen channel 333 is disposed between and in fluid communication with the intake duct 302 and the exhaust end 301*b* of the engine 301. As such, the supplemental oxygen channel 333 may in fluid communication with the exhaust end 301*b* of the engine 301 and the intake end 301*a* of the engine 301, such that the supplemental oxygen channel 333 is configured to draw in air downstream of the compressor 308, but upstream of the engine 301, and distribute said air into the engine exhaust 320 exiting the exhaust end 301*b* of the engine 301. In other words, the supplemental oxygen channel 333 may allow auxiliary oxygen to be drawn from air within the intake duct 302 downstream of the turbocharger compressor 308. The supplemental oxygen channel 333 may be identified as a type of auxiliary oxygen input, such as auxiliary oxygen input 531 of FIG. 5, which will be discussed in greater detail hereinbelow.

This configuration may allow the additional pressure provided by the compressor 308 to be utilized to introduce oxygen into the engine exhaust to ensure adequate oxygenation of said engine exhaust, as necessary. It should be understood that this supplemental oxygen may be provided in the form of ambient air and that the air fed into the engine exhaust may be tapped downstream from the compressor 308 of the turbocharger 310, as shown in FIG. 3, or provided from any other suitable source of oxygen, as applicable.

FIG. 4 illustrates a porous heat exchanger 409, according to an aspect. In an embodiment, the disclosed oxidizing reactor apparatus 400 may comprise a porous heat exchanger 409 configured to oxidize incoming fuel from the engine exhaust. The porous heat exchanger 409 may be suitably configured to work properly in any of the three embodiments described in FIG. 1-3 hereinabove, as well as other configurations having unoxidized fuel in the engine exhaust. As described hereinabove, the disclosed porous heat exchanger 409 may be configured to treat and oxidize fuel in the engine exhaust, thus reducing emissions of fuels, such as hydrocarbons, into the environment. The porous heat exchanger 409 may comprise an input port "inlet port") 409*a*, an entry channel 409*c* in communication with the input port 409*a*, an exit channel 409*d* in communication with the entry channel 409*c* and an output port 409*b* in communication with the one exit channel 409*d*. While a plurality of entry channels 409*c* and exit channels 409*d* may be utilized, at least one of each is necessary to facilitate the disclosed heat exchange therein.

Each entry channel 409*c* and exit channel 409*d* may comprise a non-porous portion 409*e* disposed on a near end/top end 409*g* of the porous heat exchanger 409 and a porous portion 409*f* disposed on a far end/bottom end 409*h*. In an embodiment, the non-porous portion 409*e* of each entry channel 409*c* may be in communication the input port 409*a*, and the porous portion 409*f* of each entry channel 409*c* may be in communication with the porous portion 409*f* of at least one exit channel 409*d*, whereas the non-porous portion 409*e* of each exit channel 409*d* may be in communication with the output port 409*b*. It should be understood that the porous portion 409*f* of each entry channel 409*c* may be in communication with the non-porous portion 409*e* of that same entry channel 409*c*, and that the porous portion 409*f* of the exit channel 409*d* may be in communication with the non-porous portion 409*e* of the exit channel 409*b*. It should also be understood that elements of the porous heat exchanger 409 that are in communication/fluid communication with each other allow gases, such as those within the engine exhaust, to flow between said elements.

In an embodiment, engine exhaust may enter the porous heat exchanger 409 through the input port 409*a* and into the non-porous portion 409*e* of the entry channel(s) 409*c*, travel through the non-porous portion 409*e* of entry channel(s) 409*c* into the corresponding porous portion 409*f* of entry channel(s) 409*c*, travel through corresponding pores 409*i* nested between the entry channels 409*c* and each corresponding exit channel 409*d* to enter the porous portion 409*f* of exit channel(s) 409*d*, travel through the porous portion 409*f* of exit channel(s) 409*d* into the corresponding non-porous portion 409*e* of exit channel(s) 409*d*, and finally travel out of non-porous portion 409*e* of exit channel(s) 409*d* into the output port 409*b* to exit the porous heat exchanger 409. It should be understood that heat may be transferred from the hotter, exiting engine exhaust of the exit channels 409*d* to the cooler, entering engine exhaust of the entry channels 409*c* through heat transfer surfaces 422 (e.g., the walls of the corresponding entry/exit channels) disposed between the entry channel(s) and adjacent exit channel(s) 409*d*. The transfer of heat may be greatest at the near end 409*g* of the porous heat exchanger 409, wherein the temperature differential between the entering engine exhaust in the entry channel(s) and the exiting engine exhaust in the exit channel(s) 409*d* is the greatest.

As can be seen in FIG. 4, porous heat exchanger 409 has a near end 409*g* and a far end 409*h* associated with the near end 409*g*, such that the near end 409*g* and far end 409*h* are disposed on opposing sides of the porous heat exchanger 409. In said embodiment, the non-porous portion 409*e* of each entry channel 409*c* of the plurality of entry channels, the non-porous portion 409*e* of each exit channel 409*d* of the plurality of exit channels, the input port 409*a* and the output port 409*b* are disposed on the near end 409*g* of the heat exchange reactor 409 and the porous portion 409*f* of each entry channel 409*c* of the plurality of entry channels and the porous portion 409*f* of each exit channel 409*d* of the plurality of exit channels are disposed on the far end 409*h* of the heat exchange reactor 409. Additionally, the heater 428 may be engaged with the far end 409*h* of the heat exchange reactor 409. It should be understood that alternative configurations of the porous heat exchanger 409 may also be utilized where desirable or necessary.

In an embodiment, entering engine exhaust 421 containing 0.3% methane by volume enters the porous heat exchanger 409 at the input port 409*a*, then travels through non-porous portion 409*e* of the entry channel 409*c*, receiving heat from exiting engine exhaust 427 in the non-porous portion 409*e* of the exit channels 409*d* through heat transfer surfaces 422 as it moves from the near end 409*g* to the far end 409*h* of the porous heat exchanger 409. For lean burn engine embodiments, the entering engine exhaust 421 temperature may be in the range of about 300° C. to about 500° C., depending on the configuration of the engine. At the transition point 423 between the non-porous portions 409*e* and porous portions 409*f* of porous heat exchanger 409, the entering engine exhaust temperature may be about 800° C.

as it enters the porous portion 409*f* of the entry channels 409*c*, for the present embodiment. In the mass transfer area 424, the entering engine exhaust seeps through the pores 409*i*, traveling from the entry channels 409*c* to the exit channels 409*d* and thus becoming exiting engine exhaust 427. As more engine exhaust seeps from the entry channels 409*c* to the exit channels 409*d*, the mass velocity of the entering engine exhaust 421 in the entry channels 409*c* decreases.

By the time the entering engine exhaust 421 reaches the terminal area 425 at the far end 409*h* of the porous heat exchanger 409, the mass velocity of the entering engine exhaust 421 in the entry channels 409*c* may be a tenth of the entering engine exhaust 421 flow at the inlet port 409*a*, and the residence time of said entering engine exhaust 421 increases tenfold, giving the fuel within the engine exhaust the time required for substantially full oxidation. With higher temperatures and reduced mass flow, substantially all fuels within the engine exhaust 421, 427 is oxidized towards the far end 409*h* of the porous heat exchanger 409, wherein said oxidation reaction may be configured to raise the temperature of the engine exhaust by about 80° C. (for a 0.3% methane by volume exhaust gas). Most of the mass transfer area 424 may be about 880° C., for the disclosed embodiment. As the now exiting engine exhaust 427 within the exit channels 409*d* travels into the non-porous portion 409*e* of the exit channel 409*d*, its mass velocity increases as it picks up more engine exhaust through the pores 409*i* of the plurality of pores. It should be understood that as the temperature within the porous heat exchanger 409 increases, so does the rate of oxidation of the fuel, such as methane, within the porous heat exchanger 409. As such, when the engine exhaust reaches the point within the porous heat exchanger 409 wherein the temperature is highest, such as the hereinabove described mass transfer area 424, the fuel within the engine exhaust may be substantially oxidized.

The exiting engine exhaust 427 traveling through the non-porous portion 409*e* of the exit channels 409*d* is now configured to heat up entering engine exhaust 421 that is traveling through the non-porous portion 409*e* of the entry channels 409*c*. Finally the exiting engine exhaust 427 exits the porous heat exchanger 409 through an output port 409*b* at a temperature that is hotter than the temperature at which it entered the inlet port 409*a* as entering engine exhaust 421, for the present embodiment. It should be noted that when air containing 0.3% methane by volume is oxidized within the disclosed porous heat exchanger 409, the temperature of the gas may increase by about 80° C.

FIG. 4 illustrates a porous heat exchanger 409 that is already in operation. When starting the porous heat exchanger 409 from a cold state (e.g., no mass flow, and thus no oxidation of fuel is occurring), it may be necessary to have a means to heat up the porous heat exchanger. This heating may be provided by combusting a gas, electrical heating or any other practical heating technique known. Once the porous heat exchanger 409 is made sufficiently hot, the heat generated by the reaction of the fuels within the engine exhaust allows the reaction to sustain itself. For example, a heater, 428 may be in thermal communication with the porous heat exchanger 409 and may be used to control the temperature at the far/bottom end 409*h*, as needed. Should the temperature of the porous heat exchanger 409 start to decline, the heater 428 can help raise said temperature accordingly. As disclosed hereinabove, the heater 428 may be electrical in nature and/or use gaseous fuel for power, in several embodiments. Such heaters 428 may be provided at several points in the porous heat exchanger 409, as needed, for suitable temperature control of the engine exhaust. In an embodiment, the heater 428 may be configured to be disposed within the porous heat exchanger 409, coming into direct contact with the engine exhaust, or may alternatively be engaged with but disposed outside of the porous heat exchanger, and heat the internally disposed engine exhaust by heating the far end 409*h* of the porous heat exchanger 409 via conduction between the heater 428 and the external surface of the porous heat exchanger 409. Other control devices utilized for conventional control techniques in reactors, such as thermocouples and pressure sensors, may be used to help maintain substantially full oxidation of the fuel(s), as will be described in greater detail hereinbelow In an embodiment, the disclosed porous heat exchanger 409 may be engaged with a reaction control system, such as reaction control system 636 of FIG. 6, wherein the reaction control system is configured to monitor the operating parameters for the porous heat exchanger, and manipulate corresponding control devices in order to optimize the oxidation reaction occurring within. Several operating parameters that may be monitored by the reaction control system in order to suitably determine if changes to device operation are required may include the temperatures of the engine exhaust received by the intake port 409*a*, the internal porous heat exchanger environment, and engine exhaust expelled from the output port 409*b*, the pressure within the porous heat exchanger 409, and the flow rate of engine exhaust through the porous heat exchanger 409. The reaction control system may also be configured to monitor the oxygen content, as well as fuel and other hydrocarbon content, within the engine exhaust received by the input port 409*a* and expelled by output port 409*b*, amongst other relevant operating parameters.

The operating parameters for the porous heat exchanger 409 may be monitored through the utilization of thermocouples, pressure gauges, flow gauges, chemical analysis devices, etc., as applicable. The reaction control system may be configured to manipulate the heater 428, amongst other control devices (e.g., compressors, solenoid valves, etc.) in order to control said operating parameters to optimize the efficiency of the oxidation reaction, thus maximizing the amount of fuel oxidized from the engine exhaust and minimizing the amount of fuel expelled from the porous heat exchanger. Other control devices may be utilized to monitor additional operating parameters, depending on the needs of the porous heat exchanger or corresponding oxidizing reactor apparatus.

In an embodiment, the fuel(s) within engine exhaust may be rapidly oxidized in the range of 800 C to 880 C, and any residual fuel, such as VOCs, formaldehyde, ethylene, carbon monoxide and hydrogen may also be oxidized. It should be understood that the size and shape of the porous heat exchanger 409 can be suitably designed to match the desired performance. In an embodiment, the porous heat exchanger 409 may be circular, with diverging walls to control flow velocity. In an embodiment, the porous heat exchanger 409 may be well-insulated thermally to keep cold spots from forming within porous heat exchanger 409 which can result in unoxidized fuel exiting the porous heat exchanger. As is understood, the non-porous portion 409*e* of each entry channel 409*c* may be in thermal communication with each corresponding non-porous portion 409*e* of each adjacent exit channel 409*d*, such that heat may be transferred from the exiting engine exhaust 427 to the entering engine exhaust 421 as described.

It should be understood that variations on the disclosed porous heat exchanger to suit a specific application, as long as its function as described herein is maintained. In an embodiment, the porous heat exchanger may comprise an input port 409*a*, an entry channel 409*c* in fluid communication with input port 409*a*, an exit channel 409*d* in fluid communication with the entry channel via a plurality of pores 409*i* (e.g. porous portions 409*f* of each channel 409*c*, 409*d*) and an output port 409*b* in fluid communication with the exit channel 409*d*, wherein the exit channel 409*d* is in thermal communication with the entry channel 409*c*. Alternatively, a plurality of entry channels 409*c* and exit channels 409*d* may be enclosed within the porous heat exchanger 409, as shown in FIG. 4, in order to increase the heat transfer area between the entry channels 409*c* and exit channels 409*d* to enable more efficient heating of the incoming, unoxidized fuel. Furthermore, depending on the amount of heating required to initiate and maintain the oxidization reaction, the heater 428 may be selectively powered and moderated. The lengths of the channels 409*c*, 409*d* for the porous portions 409*f* and non-porous portions 409*e* may also be adjusted in accordance with the flow rate and rapid oxidation temperature of the incoming gas to ensure proper function (e.g., substantially complete oxidation of the fuel prior to being expelled into the external environment.)

While the disclosed porous heat exchanger 409 may be shown as being vertically oriented throughout (i.e., the engine exhaust traveling though the porous heat exchanger 409 travels down through the entry channels 409*c* and up through the exit channels 409*d*), it should be understood that other orientations of the porous heat exchanger may be implemented as desired or necessary. In an embodiment, the porous heat exchanger 409 may be configured to "sideways" in comparison to the vertical orientation of FIG. 4, wherein the engine exhaust travels through the sideways entry channels 409*c* by traveling to the right, enters an exit channel 409*d* by traveling up or down, and travels through the exit channel by traveling to the left. Similarly, the particular shape of the entry channels 409*c* and exit channels 409*d* may be varied in accordance with the needs of the application. In contrast to the linear configuration of the entry and exit channels 409*c*, 409*d* in FIG. 4, the entry and exit channels 409*c*, 409*d* may be curved or bent. The cross-section of each entry and exit channel 409*c*, 409*d* may also be suitably modified, and may have a circular cross-section, rectangular cross-section, hexagonal cross-section, etc., as long as sufficient heat transfer between the entry channels 409*c* and exit channels 409*d* is maintained.

As described hereinabove, the disclosed porous heat exchanger 409 may be configured to maintain an ongoing oxidation reaction from a stream of incoming engine exhaust without the utilization of a catalyst. This allows for the porous heat exchanger 409 to avoid the additional operational costs associated with catalysts, including the need to repair, replace and/or maintenance the catalyst, which may be an expensive noble metal catalyst. The absence of said catalyst may also inherently simplify the structure and thus manufacturing complexity of the porous heat exchanger 409, thus further reducing the associated costs of utilizing the disclosed porous heat exchanger 409.

Figure 5:
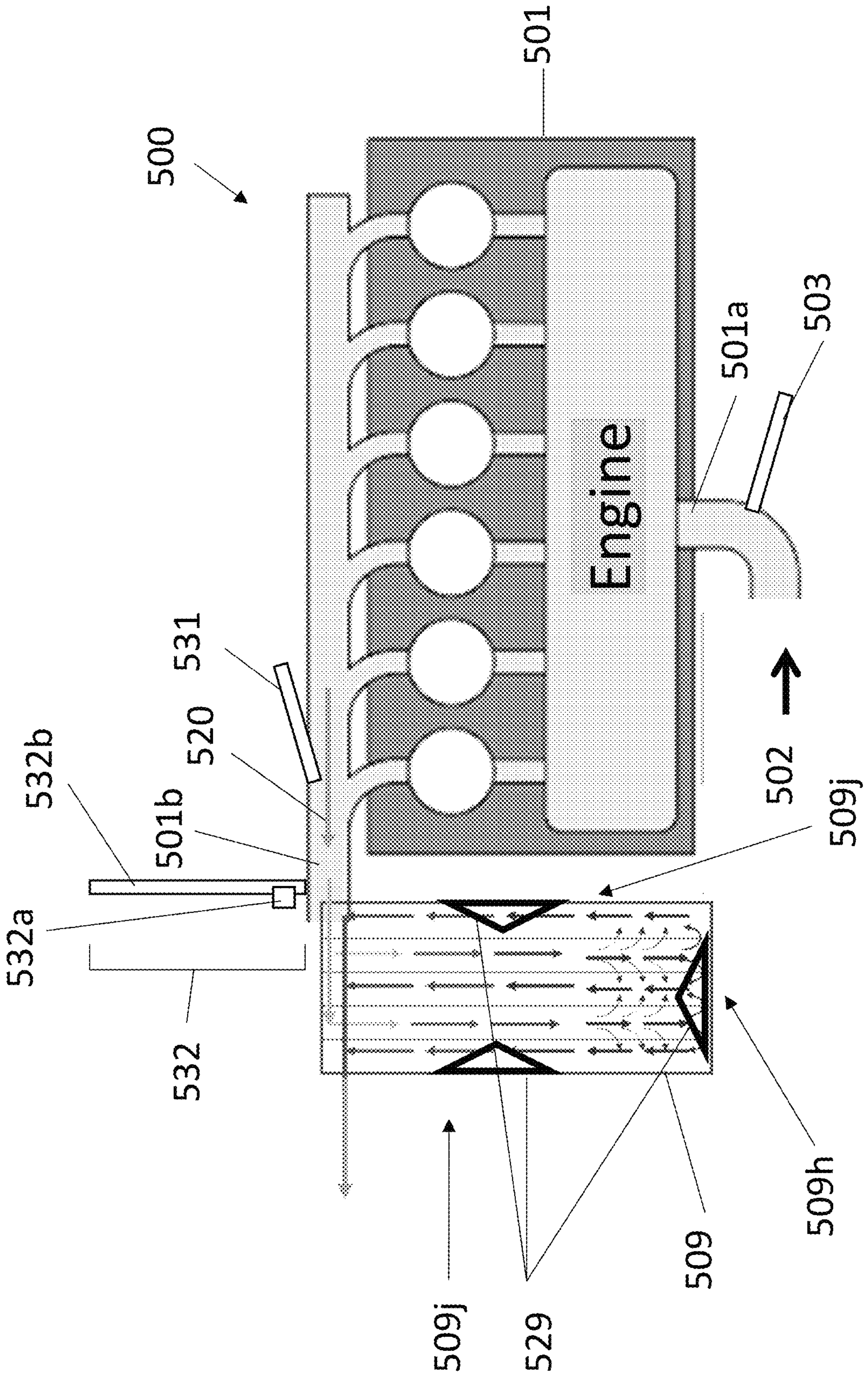
FIG. 5 illustrates an alternative embodiment of the oxidizing reactor apparatus having multiple heaters, an auxiliary oxygen input and reactor fuel line, according to an aspect.

FIG. 5 illustrates an alternative embodiment of the oxidizing reactor apparatus 500 having multiple heaters 529, an auxiliary oxygen input 531 and reactor fuel line 532, according to an aspect. As can be seen in FIG. 5, the disclosed oxidizing reactor apparatus 500 of FIG. 1, as well as the other oxidizing reactor embodiments disclosed herein, may be modified to include a plurality of elements to aid the function of the porous heat exchanger 509, depending on the specification of the overall oxidizing reactor apparatus 500. As with previously disclosed oxidizing reactor apparatus 500 embodiments, the intake end 501*a* of the engine 501 may be engaged with an intake duct 502 and in fluid communication with a fuel pipe 503.

In an embodiment, the engine 501 may be a stoichiometric or rich burn engine, rather than the lean burn engines disclosed in prior embodiments. As such, the amount of oxygen provided within the engine exhaust may prove to be insufficient to enable the substantially full oxidation of the fuel that travels through the porous heat exchanger in some embodiments. In order to overcome this potential issue in non-lean burn engine embodiments of the oxidizing reactor apparatus 500, an auxiliary oxygen input 531 may be provided. The auxiliary oxygen input 531 may be in fluid communication with the exhaust end 501*b* of the engine 501, such that additional oxygen flowing though the auxiliary oxygen input 531 may be merged with the exhaust gas 520 exiting the exhaust end 501*b* of the engine. In said embodiment, the additional oxygen from the auxiliary oxygen input 531 may be suitably merged with the exhaust gas 520 prior to entering the porous heat exchanger 509, thereby allowing for the optimized oxidation of the fuel within the porous heat exchanger without the use of a lean burn engine. As such, the disclosed auxiliary oxygen input 531 may be configured to ensure the exhaust gas is adequately oxygenated to allow for the oxidation of the fuels within the engine exhaust 520.

As disclosed hereinabove, multiple heaters 529 may be utilized within an oxidizing reactor apparatus 500 in order to ensure suitable heating, and thus rapid oxidation, of the fuel within the porous hear exchanger 509. In this disclosed embodiment, three heaters 529 may be engaged with the porous heat exchanger, one heater 529 being engaged with the far end 509*h* of the porous heat exchanger 509, and one heater 529 being engaged with each lateral side 509*j* of the porous heat exchanger 509. The disposition of a corresponding heater 529 on each lateral side 509*j* of the porous heat exchanger 509 may allow for easier temperature control of the porous heat exchanger 509 and thus the oxidation of the fuel oxidation, by allowing the entry channels of the porous heat exchanger 509 to be further heated by said heaters 529 on the lateral sides 509*j* prior to reaching the far end 509*h* of the porous heat exchanger 509. It should be understood that the positioning and quantity of the heaters 529 utilized to initiate and maintain the ongoing oxidation reaction within the porous heat exchanger 509 may be suitably modified as necessary, depending on the application.

Depending on the nature of the heaters 529 utilized to initiate and maintain fuel oxidation, different power sources may be utilized, as necessary. In an embodiment, each heater 529 may be primarily electrical in nature, and thus each heater 529 may be in electrical communication with an electrical power source. In an alternative embodiment, the heaters 529 may be configured to provide heat by igniting heater fuel. Said heaters 529 may be provided on the inside or outside of the porous heat exchanger 509. In an alternative embodiment, an auxiliary heater 532 comprises an auxiliary fuel line 532*b* and an igniter 532*a* engaged with the auxiliary fuel line 532*b* may be provided. Said auxiliary heater 532 may be configured to engage with the oxidizing reactor apparatus 500 upstream of the porous heat exchanger 509, wherein said heater fuel may be provided through the corresponding auxiliary fuel line 532*b*. During warmup, the heater fuel is introduced and ignited by the igniter 532*a*, to introduce hot, combusted gas into oxidizing reactor apparatus 500 to heat the porous heat exchanger 509.

The auxiliary heater 532 may be in fluid communication with the exhaust end 501_b_ of the engine 501. The heater fuel provided by the auxiliary fuel line 532_b_ may be any suitable fuel for providing ignition, including natural gas, propane or other fuels. Similarly to the prior disclosed heaters 529, the auxiliary heater 532 may help to provide both the initial warmup and to maintain the oxidation reaction occurring within the porous heat exchanger 509 by selectively providing additional heat as needed. In an embodiment, when the porous heat exchanger reaches as suitable temperature for oxidation of the fuel, such as about 800° C., the auxiliary heater 532 may be configured to stop introducing fuel until the temperature in the porous section of the porous heat exchanger 509 drops below a certain minimum temperature threshold. This additional heating raises the temperature in the porous section of the porous heat exchanger 509 to the desired level. As will be disclosed in greater detail hereinbelow, each embodiment of the disclosed oxidizing reactor apparatus may be suitably outfitted with a corresponding reaction control system having several monitors/sensors configured to measure temperature, pressure, etc., wherein said monitors/sensor are configured to feed the collected information to a controller, such as controller 635 of FIG. 6.

Figure 6:
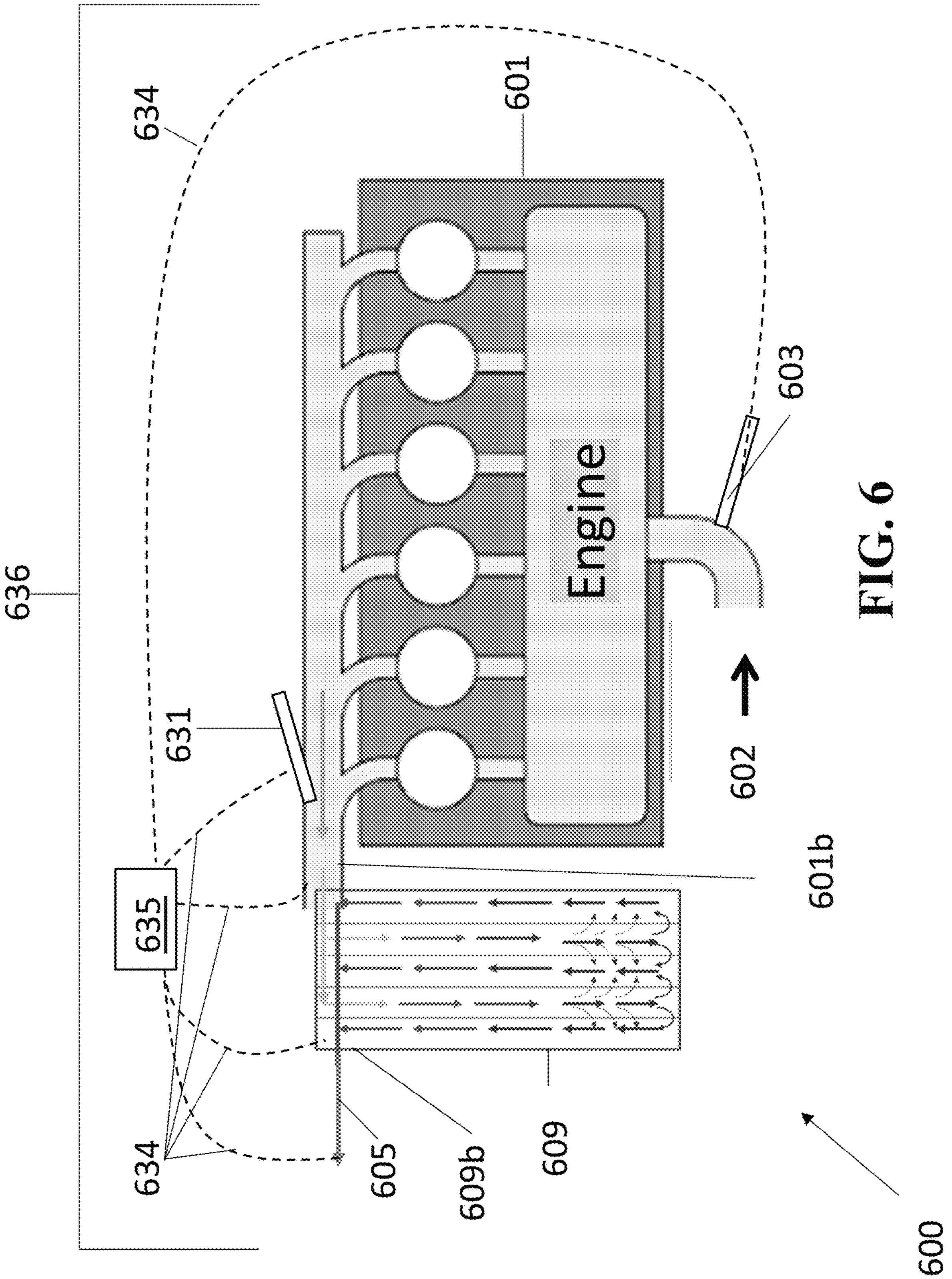
FIG. 6 illustrates an alternative embodiment of the oxidizing reactor apparatus having a reaction control system, according to an aspect.

FIG. 6 illustrates an alternative embodiment of the oxidizing reactor apparatus 600 having a reaction control system 636, according to an aspect. A reaction control system 636 may be incorporated into the structure of an oxidizing reactor apparatus 600 embodiment in order to provide a mechanism to suitably monitor and control the operating parameters for the oxidizing reactor apparatus 600, including those of the porous heat exchanger 609. The reaction control system 636 may comprise a controller 635, and a plurality of monitors, sensors and/or control devices (not shown) in electrical communication 634 with the controller 635, wherein the reaction control system 636 is configured to observe and manipulate the operating parameters for the oxidizing reactor apparatus 600. In an embodiment, a corresponding monitor, sensor and/or control device may be associated with each of the following: the fuel pipe 603 (which is in fluid communication with the intake duct 602), the auxiliary oxygen input 631, the exhaust end 601_b_ of the engine 601, and the output port 609_b_ of the porous heat exchanger 609 (which itself contains the oxidized engine exhaust 605 leaving the porous heat exchanger 609.)

The controller 635 may be configured to measure the operating parameters, such as temperature, pressure, fuel concentration, etc., of the engine exhaust at various points as it travels from the exhaust end 601_b_ of the engine 601 to the output port 609_b_ of the porous heat exchanger 609, thus allowing for any necessary modifications to be made to said operating parameters during operation, to ensure maximized oxidation of the fuel within the engine exhaust. As such, the controller 635 may be configured to both receive information input from and output suitable commands to the devices that it is in electrical communication 634 with, to facilitate said maximized oxidation of the fuel while conserving energy. As disclosed hereinabove, the utilization of an auxiliary oxygen input may enable the usage of a stoichiometric or rich burn engine 601 within the oxidizing reactor apparatus 600.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. An oxidizing reactor apparatus comprising:

a lean burn engine having an intake end and an exhaust end in fluid communication with the intake end, the lean burn engine being configured to combust a fuel and expel an engine exhaust, wherein the engine exhaust comprises an unoxidized fuel;

a heat exchange reactor configured to be in fluid communication with the lean burn engine, the heat exchange reactor being configured to receive the engine exhaust expelled by the lean burn engine and facilitate an oxidization of the unoxidized fuel, the heat exchange reactor comprising:

an input port in fluid communication with the exhaust end of the lean burn engine;

a plurality of entry channels in fluid communication with the input port, each entry channel of the plurality of entry channels comprising:

a non-porous portion of the entry channel, the non-porous portion of the entry channel being in fluid communication with the input port; and a porous portion of the entry channel, the porous portion of the entry channel being in fluid communication with the non-porous portion of the corresponding entry channel;

a plurality of exit channels in fluid communication with the plurality of entry channels, each exit channel of the plurality of exit channels comprising:

a porous portion of the exit channel, the porous portion of the exit channel being in fluid communication with the porous portion of at least one entry channel of the plurality of entry channels; and a non-porous portion of the exit channel, the non-porous portion of the exit channel being in fluid communication with the porous portion of the corresponding exit channel; and an output port in fluid communication with the non-porous portion of each exit channel of the plurality of exit channels;

a heater configured to be engaged with the heat exchange reactor, wherein the heater is further configured to selectively provide heat to the heat exchange reactor to facilitate the oxidation of the unoxidized fuel within the heat exchange reactor; and a turbocharger configured to be associated with the lean burn engine, the turbocharger having:

a turbine in fluid communication with the exhaust end of the lean burn engine;

a turbocharger shaft engaged with the turbine; and a compressor in fluid communication with the intake end of the lean burn engine and engaged with the turbocharger shaft;

wherein the non-porous portion of each entry channel of the plurality of entry channels is in thermal communication with the non-porous portion of at least one exit channel of the plurality of exit channels, such that the non-porous portion of each exit channel of the plurality of exit channels is configured to transfer heat energy to the non-porous portion of at least one entry channel of the plurality of entry channels; and wherein the porous portion of each exit channel of the plurality of exit channels is configured to receive engine exhaust from the porous portion of at least one entry channel of the plurality of entry channels through a plurality of pores, wherein each pore of the plurality of pores is disposed between an exit channel of the plurality of exit channels and a corresponding entry channel of the plurality of entry channels;

wherein the unoxidized fuel is oxidized in the heat exchange reactor in an absence of catalyst.

2. The oxidizing reactor apparatus of claim 1, wherein the heat exchange reactor is positioned downstream from the turbine of the turbocharger, such that the turbine is disposed between the heat exchange reactor and the exhaust end of the lean burn engine, wherein a flow of engine exhaust through the turbine is configured to power the compressor.

3. The oxidizing reactor apparatus of claim 1, wherein the heat exchange reactor is positioned upstream from the turbine of the turbocharger, such that the heat exchange reactor is disposed between the turbine and the exhaust end of the lean burn engine, wherein a flow of engine exhaust through the turbine is configured to power the compressor.

4. The oxidizing reactor apparatus of claim 1, wherein the heat exchange reactor has a near end and a far end associated with the near end, wherein the non-porous portion of each entry channel of the plurality of entry channels, the non-porous portion of each exit channel of the plurality of exit channels, the input port and the output port are disposed on the near end of the heat exchange reactor and the porous portion of each entry channel of the plurality of entry channels and the porous portion of each exit channel of the plurality of exit channels are disposed on the far end of the heat exchange reactor.

5. An oxidizing reactor apparatus comprising:

an engine having an intake end and an exhaust end in fluid communication with the intake end, the engine being configured to combust a fuel and expel an engine exhaust, wherein the engine exhaust comprises an unoxidized fuel;

a heat exchange reactor configured to be in fluid communication with the engine, the heat exchange reactor being further configured to receive the engine exhaust expelled by the engine and facilitate an oxidization of the unoxidized fuel, the heat exchange reactor comprising:

an input port in fluid communication with the exhaust end of the engine;

a plurality of entry channels in fluid communication with the input port, each entry channel of the plurality of entry channels comprising:

a non-porous portion of the entry channel, the non-porous portion of the entry channel being in fluid communication with the input port; and a porous portion of the entry channel, the porous portion of the entry channel being in fluid communication with the non-porous portion of the corresponding entry channel;

a plurality of exit channels in fluid communication with the plurality of entry channels, each exit channel of the plurality of exit channels comprising:

a porous portion of the exit channel, the porous portion of the exit channel being in fluid communication with the porous portion of at least one entry channel of the plurality of entry channels; and a non-porous portion of the exit channel, the non-porous portion of the exit channel being in fluid communication with the porous portion of the corresponding exit channel; and an output port in fluid communication with the non-porous portion of each exit channel of the plurality of exit channels;

a heater configured to be engaged with the heat exchange reactor, wherein the heater is further configured to selectively provide heat to the heat exchange reactor to facilitate the oxidation of the unoxidized fuel within the heat exchange reactor;

wherein the non-porous portion of each entry channel of the plurality of entry channels is in thermal communication with the non-porous portion of at least one exit channel of the plurality of exit channels, such that the non-porous portion of each exit channel of the plurality of exit channels is configured to transfer heat energy to the non-porous portion of at least one entry channel of the plurality of entry channels; and wherein the porous portion of each exit channel of the plurality of exit channels is configured to receive engine exhaust from the porous portion of at least one entry channel of the plurality of entry channels through a plurality of pores, wherein each pore of the plurality of pores is disposed between an exit channel of the plurality of exit channels and a corresponding entry channel of the plurality of entry channels;

wherein the unoxidized fuel is oxidized in the heat exchange reactor in an absence of catalyst.

6. The oxidizing reactor apparatus of claim 5, further comprising a turbocharger having:

a turbine in fluid communication with the output port of the heat exchange reactor, such that the heat exchange reactor is disposed between the turbine and the engine;

a turbocharger shaft engaged with the turbine; and a compressor engaged with the turbocharger shaft, the compressor being in fluid communication with the intake end of the engine;

wherein a flow of engine exhaust through the turbine is configured to power the compressor.

7. The oxidizing reactor apparatus of claim 6, wherein the oxidation of unoxidized fuel within the heat exchange reactor is configured to provide energy to the engine exhaust entering the turbine, thus increasing an amount of energy generated by the turbine and utilized by the compressor.

8. The oxidizing reactor apparatus of claim 6, further comprising an auxiliary oxygen input in fluid communication with the exhaust end of the engine and the intake end of the engine, such that the auxiliary oxygen input is configured to draw in air downstream from the compressor and distribute said air into the engine exhaust exiting the exhaust end of the engine upstream of the turbine.

9. The oxidizing reactor apparatus of claim 5, further comprising a turbocharger having:

a turbine in fluid communication with the exhaust end of the engine and the input port of the heat exchange reactor, such that the turbine is disposed between the engine and heat exchange reactor;

a turbocharger shaft engaged with the turbine; and a compressor engaged with the turbocharger shaft, the compressor being in fluid communication with the intake end of the engine;

wherein a flow of engine exhaust through the turbine is configured to power the compressor.

10. The oxidizing reactor apparatus of claim 5, wherein the unoxidized fuel comprises methane.

11. The oxidizing reactor apparatus of claim 10, wherein the heat exchange reactor is configured to heat the unoxidized fuel to at least 800° C. to facilitate rapid oxidation of the methane in the unoxidized fuel.

12. The oxidizing reactor apparatus of claim 5, wherein the heat exchange reactor has a near end and a far end associated with the near end, wherein the non-porous portion of each entry channel of the plurality of entry channels, the non-porous portion of each exit channel of the plurality of exit channels, the input port and the output port are disposed on the near end of the heat exchange reactor and the porous portion of each entry channel of the plurality of entry channels and the porous portion of each exit channel of the plurality of exit channels are disposed on the far end of the heat exchange reactor, wherein the heater is engaged with the far end of the heat exchange reactor.

13. The oxidizing reactor apparatus of claim 5, wherein the heat exchange reactor comprises a metal.

14. The oxidizing reactor apparatus of claim 5, further comprising an auxiliary oxygen input in fluid communication with the exhaust end of the engine, wherein the auxiliary oxygen input is configured to provide additional oxygen to the engine exhaust entering the heat exchange reactor.

15. An oxidizing reactor apparatus comprising:

an engine configured to expel an engine exhaust having a unoxidized fuel;

a heat exchange reactor configured to be in fluid communication with the engine, the heat exchange reactor being further configured to receive the expelled engine exhaust to facilitate an oxidization of the unoxidized fuel, the heat exchange reactor comprising:

an input port in fluid communication with the engine, the input port being configured to receive the engine exhaust;

an entry channel in fluid communication with the input port, the entry channel comprising:

a non-porous portion of the entry channel, the non-porous portion of the entry channel being in fluid communication with the input port; and a porous portion of the entry channel, the porous portion of the entry channel being in fluid communication with the non-porous portion of the entry channel;

an exit channel in fluid communication with the entry channel, the exit channel comprising:

a porous portion of the exit channel, the porous portion of the exit channel being in fluid communication with the porous portion of the entry channel; and a non-porous portion of the exit channel, the non-porous portion of the exit channel being in fluid communication with the porous portion of the exit channel; and an output port in fluid communication with the porous portion of the exit channel; and a heater configured to be engaged with the heat exchange reactor, wherein the heater is further configured to selectively provide heat to the heat exchange reactor to facilitate the oxidation of the unoxidized fuel;

wherein the non-porous portion of the entry channel is in thermal communication with the non-porous portion of the exit channel, such that the non-porous portion of the exit channel is configured to transfer heat energy to the non-porous portion of the entry channel; and wherein the porous portion of the exit channel is configured to receive the engine exhaust from the porous portion of the entry channel through pores disposed between the entry channel and the exit channel;

wherein the unoxidized fuel is oxidized in the heat exchange reactor in an absence of catalyst.

16. The oxidizing reactor apparatus of claim 15, wherein the heat exchange reactor has a near end and a far end associated with the near end, wherein the non-porous portion of the entry channel, the non-porous portion of the exit channel, the input port and the output port are disposed on the near end of the heat exchange reactor and the porous portion of the entry channel and the porous portion of the exit channel are disposed on the far end of the heat exchange reactor.

17. The oxidizing reactor apparatus of claim 15, further comprising a turbocharger having:

a turbine in fluid communication with the output port of the heat exchange reactor;

a turbocharger shaft engaged with the turbine; and a compressor engaged with the turbocharger shaft, the compressor being in fluid communication with an intake end of the engine;

wherein a flow of the engine exhaust through the turbine is configured to power the compressor.

18. The oxidizing reactor apparatus of claim 17, wherein the oxidation of fuel within the heat exchange reactor is configured to provide energy to the engine exhaust entering the turbine, thus increasing an amount of energy generated by the turbine and utilized by the compressor.

19. The oxidizing reactor apparatus of claim 17, further comprising an auxiliary oxygen input in fluid communication with an exhaust end of the engine and the intake end of the engine, such that the auxiliary oxygen input is configured to draw in air downstream from the compressor and distribute said air into the engine exhaust exiting the exhaust end of the engine upstream of the turbine.

20. The oxidizing reactor apparatus of claim 15, further comprising a turbocharger having:

a turbine in fluid communication with the input port of the heat exchange reactor;

a turbocharger shaft engaged with the turbine; and a compressor engaged with the turbocharger shaft, the compressor being in fluid communication with an intake end of the engine;

wherein a flow of the engine exhaust through the turbine is configured to power the compressor.

21. The oxidizing reactor apparatus of claim 15, further comprising an auxiliary oxygen input in fluid communication with an exhaust end of the engine, wherein the auxiliary oxygen input is configured to provide additional oxygen to the engine exhaust entering the heat exchange reactor.

22. The oxidizing reactor apparatus of claim 15, wherein the heat exchange reactor is configured to be in fluid communication with a plurality of engines, such that engine exhaust from each engine of the plurality of engines is configured to flow through the heat exchange reactor.

* * * * *